M. JOHNSON.
ANIMAL TRAP.
APPLICATION FILED NOV. 2, 1908.
927,149.
Patented July 6, 1909.
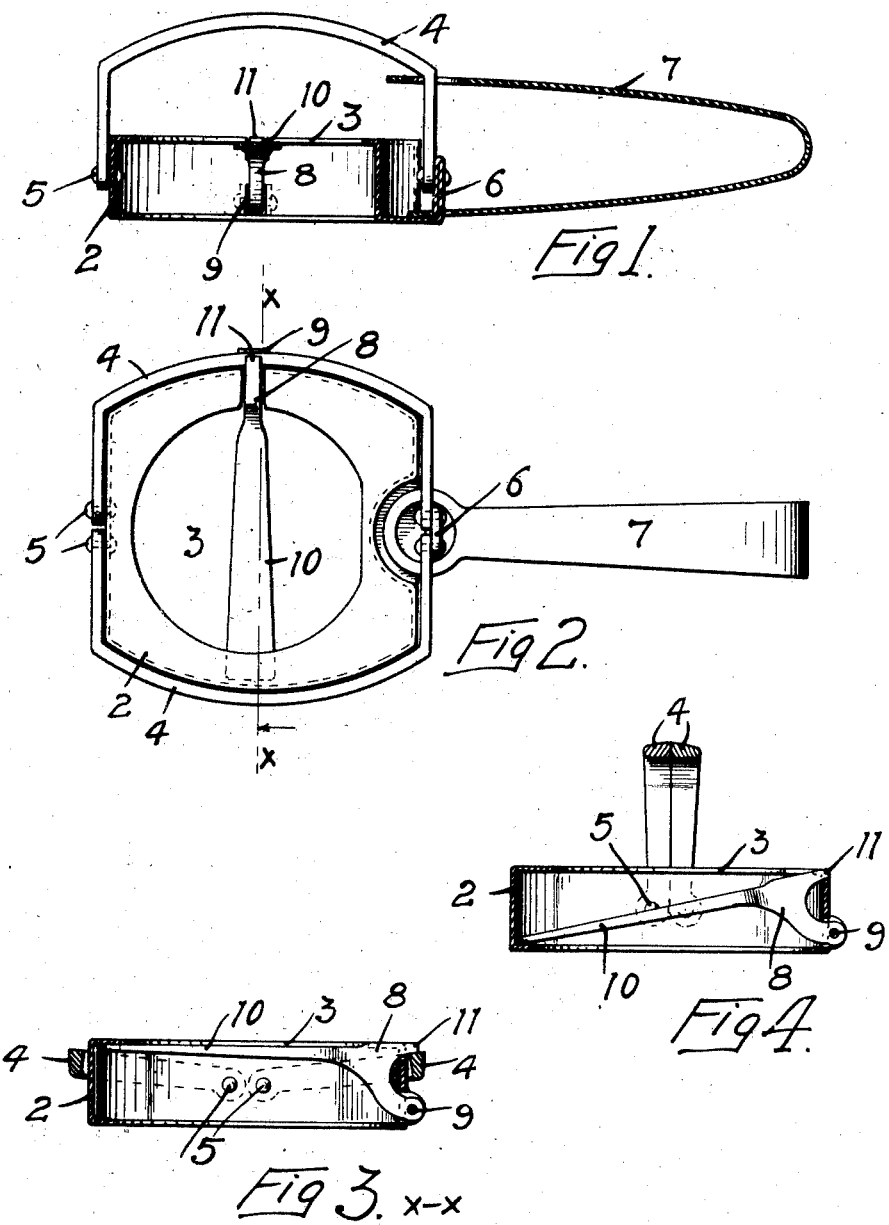
WITNESSES
INVENTOR
MARTIN JOHNSON
BY Paul & Paul
HIS ATTORNEYS

UNITED STATES PATENT OFFICE.

MARTIN JOHNSON, OF MINNEOTA, MINNESOTA.

ANIMAL-TRAP.

No. 927,149.	Specification of Letters Patent.	Patented July 6, 1909.

Application filed November 2, 1908. Serial No. 460,607.

*To all whom it may concern:*

Be it known that I, MARTIN JOHNSON, of Minneota, Lyon county, Minnesota, have invented certain new and useful Improvements in Animal-Traps, of which the following is a specification.

The object of my invention is to provide a trap which can be set in mud or leaves and covered over with earth and leaves without danger of interfering with or preventing the movement of the trigger to release the jaws of the trap. Generally when traps of this kind are set and the trigger covered with a suitable material, there is danger of sticks or earth working in under the trigger and preventing its depression when the animal steps into the trap. It also happens that sticks or some other foreign substance may get between the jaws when they are released and prevent them from closing entirely and allowing the escape of the animal. My invention obviates this objection to the ordinary trap.

The invention consists generally in a box or casing inclosing the trigger and whereon the trap jaws are mounted.

In the accompanying drawings forming part of this specification, Figure 1, is a sectional view of a trap embodying my invention, Fig. 2, is a top view of the same, Fig. 3, is a sectional view on the line *x—x* of Fig. 2, Fig. 4, is a view corresponding to Fig. 3 showing the jaws of the trap closed.

In the drawing, 2 represents a box or casing closed on the sides, open at the bottom, and having an opening 3 in its top. The box is flattened in form and is preferably made of metal and is adapted to be placed in the soil or embedded in the leaves, or it may be set in the weeds or grass of a marsh or swamp.

4 represents the jaws of the trap of ordinary construction pivoted at 5 to a side wall of the box and to a bracket 6 on the opposite side. A spring 7 of ordinary construction, is provided having the usual loop inclosing the ends of the jaws on one side of the trap.

The trigger 8 is pivoted at 9 on the box and has an arm 10 extending across the opening 3 and a lug 11 that is adapted to engage one of the jaws when they are open and lock them in an open position. The end of the arm 10 extends under the top of the box at the edge of the opening 3 and is held thereby against upward movement. It is free however to swing downward within the box for the purpose of withdrawing the lug 11 out of the path of the jaw. The trigger being inclosed on the sides, the trap may be set in mud or leaves and covered with grass with earth sprinkled thereon and when an animal steps on the trigger, it will surely be depressed and the jaws released. The trigger is so thoroughly protected against obstructions, in the shape of sticks, stones or earth, that I am able to set the trap down level with the ground without danger of the trigger being clogged or the trap rendered inoperative.

I claim as my invention:—

1. An animal trap comprising a box having closed sides and an open top, and a flange inclosing the opening in said top, jaws hinged on said box, an actuating spring for said jaws, a trigger hinged at one end in the lower side walls of said box and having a horizontally projecting arm, which extends across the opening in the top of said box and has one end covered and protected by said flange, and the pivoted end of said trigger having a lug projecting into the path of one of said jaws, substantially as described.

2. An animal trap comprising a box having closed sides and an open top, and a flange provided with a slot and inclosing the opening in said top, jaws hinged on said box, an actuating spring for said jaws, a trigger, hinged at one end in the lower side walls of said box and having a horizontally projecting arm which extends across the opening in the top of said box and has one end covered and protected by said flange, and the pivoted end of said trigger having a lug projecting horizontally therefrom through the slot provided in said flange and into the path of one of said jaws.

In witness whereof I have hereunto set my hand this 28th day of October, 1908.

MARTIN JOHNSON.

Witnesses:
S. B. ERICKSON,
H. J. LILLEMANT.